(12) United States Patent
Torrano Carrillo et al.

(10) Patent No.: US 11,018,619 B2
(45) Date of Patent: May 25, 2021

(54) PHOTOVOLTAIC CABLING OPTIMIZATION FOR SOLAR TRACKERS USING A PLUG AND PLAY HARNESS CONFIGURATION

(71) Applicant: SOLTEC ENERGIAS RENOVABLES S.L., Murcia (ES)

(72) Inventors: Francisco Javier Torrano Carrillo, Murcia (ES); Jose Alfonso Teruel Hernandez, Murcia (ES)

(*) Notice: Subject to any disclaimer, the term of this patent is extended or adjusted under 35 U.S.C. 154(b) by 81 days.

(21) Appl. No.: 16/129,012

(22) Filed: Sep. 12, 2018

(65) Prior Publication Data

US 2020/0083837 A1    Mar. 12, 2020

(51) Int. Cl.
*H02S 20/32* (2014.01)
*H02S 40/32* (2014.01)
*H02S 40/34* (2014.01)

(52) U.S. Cl.
CPC ........... *H02S 20/32* (2014.12); *H02S 40/32* (2014.12); *H02S 40/34* (2014.12)

(58) Field of Classification Search
None
See application file for complete search history.

(56) References Cited

U.S. PATENT DOCUMENTS

| 6,268,559 | B1 | 7/2001 | Yamawaki | |
|---|---|---|---|---|
| 8,937,249 | B2 | 1/2015 | Solon | |
| 2011/0209741 | A1* | 9/2011 | Solon | H01H 85/0241 136/244 |
| 2016/0049791 | A1* | 2/2016 | Johnston | H02M 7/42 361/104 |

* cited by examiner

*Primary Examiner* — Magali P Slawski
(74) *Attorney, Agent, or Firm* — Eugenio J. Torres-Oyola; Victor M Rodriguez-Reyes; Ferraiuoli LLC

(57) ABSTRACT

Photovoltaic cabling optimization for trackers using a plug and play harness configuration. A cable harness configuration for a photovoltaic, PV, installation including a plurality of solar trackers arranged in rows in a N-S direction, each solar tracker comprising a plurality of photovoltaic modules, and a switch-box or an inverter, the cable harness configuration comprising a plurality of output strings, for each solar tracker, a trunk cable, and one or more connector devices connecting said plurality of strings and said trunk cable. Each solar tracker has associated a fuse-box with a plurality of connection inputs and said fuse-box has a single cable or connector output which is connected to the trunk cable through the use of said connector device.

15 Claims, 4 Drawing Sheets

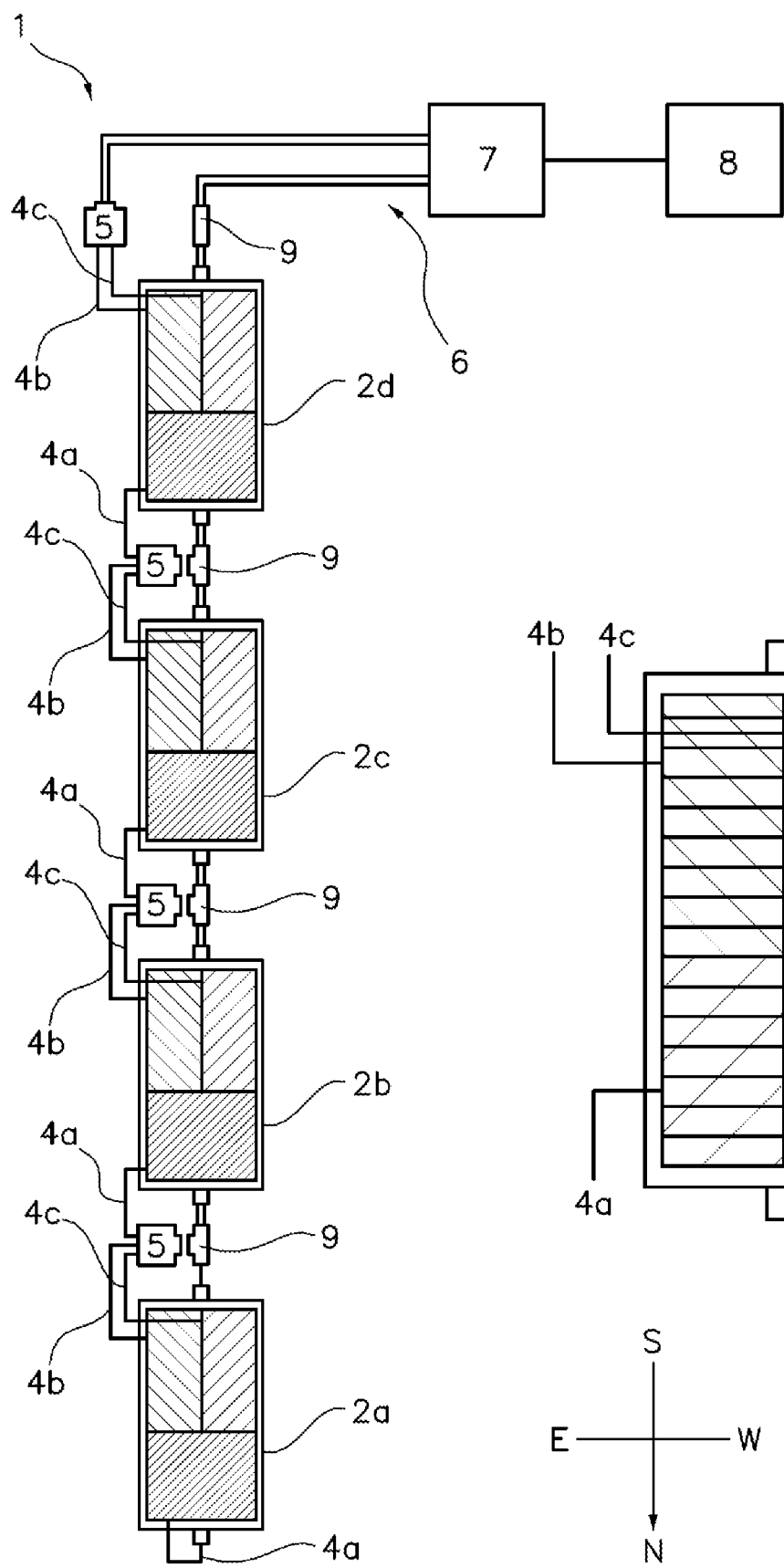
*Fig.1*
*Fig.2*
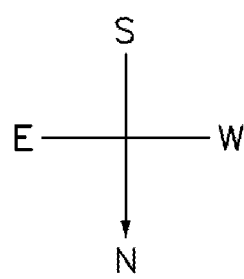

PHOTOVOLTAIC CABLING OPTIMIZATION FOR SOLAR TRACKERS USING A PLUG AND PLAY HARNESS CONFIGURATION

TECHNICAL FIELD

The present invention discloses an improved cable harness for use in a photovoltaic installation, to reduce the set-up time necessary for assembling the photovoltaic installation and also reduces the amount of cables used to connect a plurality of solar trackers which comprise multiple photovoltaic modules, in relation to other known cable harness configurations used in the present state of the art.

The term "photovoltaic modules" should also be understood as solar panels or photovoltaic panels, whereas the term "photovoltaic installation" is also commonly referred to as a photovoltaic power station, a photovoltaic system, a solar park or a solar farm, amongst others.

Furthermore, the abbreviation PV may be used throughout this document instead of the term photovoltaic.

STATE OF THE ART

In the current state of the art there exist many cable harness configurations for a PV installation comprising one or more rows of solar trackers. A typical cable solution would be connecting all the different strings of each solar tracker of each row to a string combiner box through several inputs and then combining, fusing or connecting the strings together, forming at least one conductor output from the combiner box. These one or more conductor outputs are then connected to an inverter or other suitable power conversion unit, to be supplied to an electric grid.

However, this particular solution uses a substantial amount of cables which increases the set-up time, cost and maintenance of the PV installation.

A cable harness configuration solution is shown in U.S. Pat. No. 8,937,249, which discloses a wire harness comprising multiple cable branch inputs from multiple junction boxes, each branch cable comprising an in-line fuse. The wire harness fuses or connects together the single trunk cable output to be connected to a recombiner box, each junction box connected to a solar panel.

On the other hand, U.S. Pat. No. 6,268,559, discloses a wiring apparatus for a PV installation which has a plurality of output terminals connected to a trunk cable through a plurality of branch cables, so that each branch cable is connected to one of the output terminals, each output terminal connecting photovoltaic modules of a generating section of the PV installation.

The aim of the present invention is to solve the issues in the current state of the art by eliminating the use of combiner boxes incorporating an optimized plug and play harness or a rapid connection cable harness in a PV installation which reduces the volume of cables used as well as the set-up time of the photovoltaic installation.

Another aim of the present invention is to improve the safety devices included in the proposed cable harness solution by including safety elements in string interconnection devices.

BRIEF DESCRIPTION OF THE INVENTION

The present invention discloses a cable harness configuration for a photovoltaic installation, preferably a plug and play or rapid connection and assembly cable harness. A photovoltaic installation generally comprises a plurality of solar trackers arranged in rows in a North-to-South (N-S) direction, in such a manner that the rows are preferably adjacent and parallel to one another, as well as sufficiently spaced apart so as to avoid or reduce shading between themselves, as much as possible.

The solar trackers of each row are installed or arranged on a mechanical structure which comprises a frame for each one of the solar trackers with multiple structural support elements fixed to the ground and a string-runner case which is coaxial to a N-S axis of rotation around which the solar trackers rotate. Alternatively, the mechanical structure may comprise a frame which encloses all solar trackers of each row, instead of individual frames for each solar tracker.

The string-runner case is a cable guiding and protection component which is mounted or installed on each end of the axis of rotation of a row of solar trackers, so that the different cables of each row of solar trackers are inserted through the string-runner. The string-runner can incorporate both string cables as well as trunk cables of each row of solar trackers of the PV installation. Furthermore, the string-runner has a sleeve which allows the cables inserted in the string-runner to rotate along with the rotation of the solar trackers, therefore reducing friction.

Each one of the solar trackers includes one or more photovoltaic modules connected according to different possible configurations, such as connected in series, in parallel, in leap-frog or a combination thereof, forming one or more output strings which are a part of the cable harness disclosed herein.

In certain embodiments, the PV installation may also include a switch-box and optionally an inverter or other suitable power conversion unit to convert direct current into alternating current and supply the electric energy generated to an electric grid or alternatively to an off-grid electrical network.

The cable harness configuration disclosed in the present invention, is made up of one or more strings, as stated previously, preferably three or more strings for each solar tracker, each string electrically connecting a predetermined number of said photovoltaic modules. These strings are connected to a trunk cable using multiple connector devices and fuse-boxes. In certain embodiments, both the strings of each solar tracker and the trunk cable are guided through the string-runner case, which extends along the entire length of each row of solar trackers.

The fuse-boxes are preferably installed on the frame of each solar tracker or on one of the structural support elements of the row of solar trackers, arranged in between adjacent solar trackers, however the fuse-boxes may also be integrated in the string-runner case. Each one of the fuse-boxes comprises a plurality of connection inputs according to the number of strings to be inputted into each one of them, which are connected in parallel and include a fuse or safety device connected in series for each one of the strings inputted in the fuse-box. The inputted strings are connected together in parallel forming a single connector or cable output from the fuse-box which is connected to the trunk cable through the use of a suitable connector device, usually a T-connector or a single connector.

In an embodiment, both the strings and the trunk cable are each made up of two independent cables, so that a first cable is a positive electric pole cable and a second cable is a negative electric pole cable. Therefore, for this particular embodiment, the fuse-box is either made up of two separate fuse-boxes, so that a first fuse-box is used to connect the positive electric pole cables of each string forming one positive connector output, and a second fuse-box is used to connect the negative electric pole cables of each string forming one negative connector output, or the fuse-box includes multiple input connectors suitable for both positive and negative inputs and two independent positive and negative connector outputs.

Regardless of the fuse-box design, the output of the fuse-box, for both the positive and negative cable portions of the strings, is connected to a suitable connector device arranged on both the positive and the negative trunk cable.

In embodiments of the PV installation, the fuse-boxes installed in the rows of solar trackers may include an electric current measuring device, capable of measuring the electric current of each string inserted in each fuse-box, as well as the electric current output from the fuse-box.

The electric current measurements obtained by said electric current measuring device are transmitted, preferably wirelessly by means of a wireless communication system, to a control or a monitoring station of the PV installation, in order to maintain a detailed log of the performance of each solar tracker and detect any possible malfunctions in the installation. The device is preferably powered using one or more photovoltaic cells or panels arranged on a portion of the casing of the fuse-box exposed to the sun, although other suitable powering devices or systems may be used.

Furthermore, the trunk cable outputs, meaning the positive and negative trunk cables, are connected to an equivalent number of input connectors or other suitable means of connection of the switch-box or an inverter, such as a cable gland.

The solar trackers of each row may be connected to the trunk cable, and in some embodiments to a switch-box or an inverter, according to a plurality of possible wiring configurations based on the number of strings of each solar tracker, such as 9+3 wiring configuration, 10+2 wiring configuration, 12+4 wiring configuration and so forth.

The 9+3 wiring configuration is usually used in order to simplify the installation, logistics and set-up time of the PV installation, as well as operation and maintenance tasks, as it uses standardised components, whereas the 10+2 wiring configuration is used in order to reduce and optimise the amount of cabling used in the PV installation, therefore resulting in a more cost-effective PV installation when compared with the standard 9+3 configuration.

For instance, the wiring configuration used in the PV installation disclosed in FIG. 1 is the 10+2 wiring configuration.

In embodiments, in which the trunk cable of the PV installation is connected to a switch-box, the PV installation may include a switch-box for every two rows of solar trackers. The use of a switch-box for every two rows of solar trackers, results in cost savings as well as reducing the amount of equipment used, as it reduces the amount of cabling used and implements one switch for every two rows.

It will be understood that references to geometric position, such as parallel, perpendicular, tangent, etc. allow deviations up to ±5° from the theoretical position defined by this nomenclature.

It will also be understood that any range of values given may not be optimal in extreme values and may require adaptations of the invention when these extreme values are applicable, such adaptations within reach of a skilled person.

Other features of the invention appear from the following detailed description of an embodiment.

BRIEF DESCRIPTION OF THE FIGURES

The foregoing and other advantages and features will be more fully understood from the following detailed description of an embodiment with reference to the accompanying drawings, to be taken in an illustrative and non-limitative manner, in which:

FIG. 1 illustrates a schematic lay-out of a particular embodiment of a photovoltaic installation according to the present invention;

FIG. 2 illustrates a detailed view of one of the solar trackers included in the photovoltaic installation;

DETAILED DESCRIPTION OF AN EMBODIMENT

Figure 3:
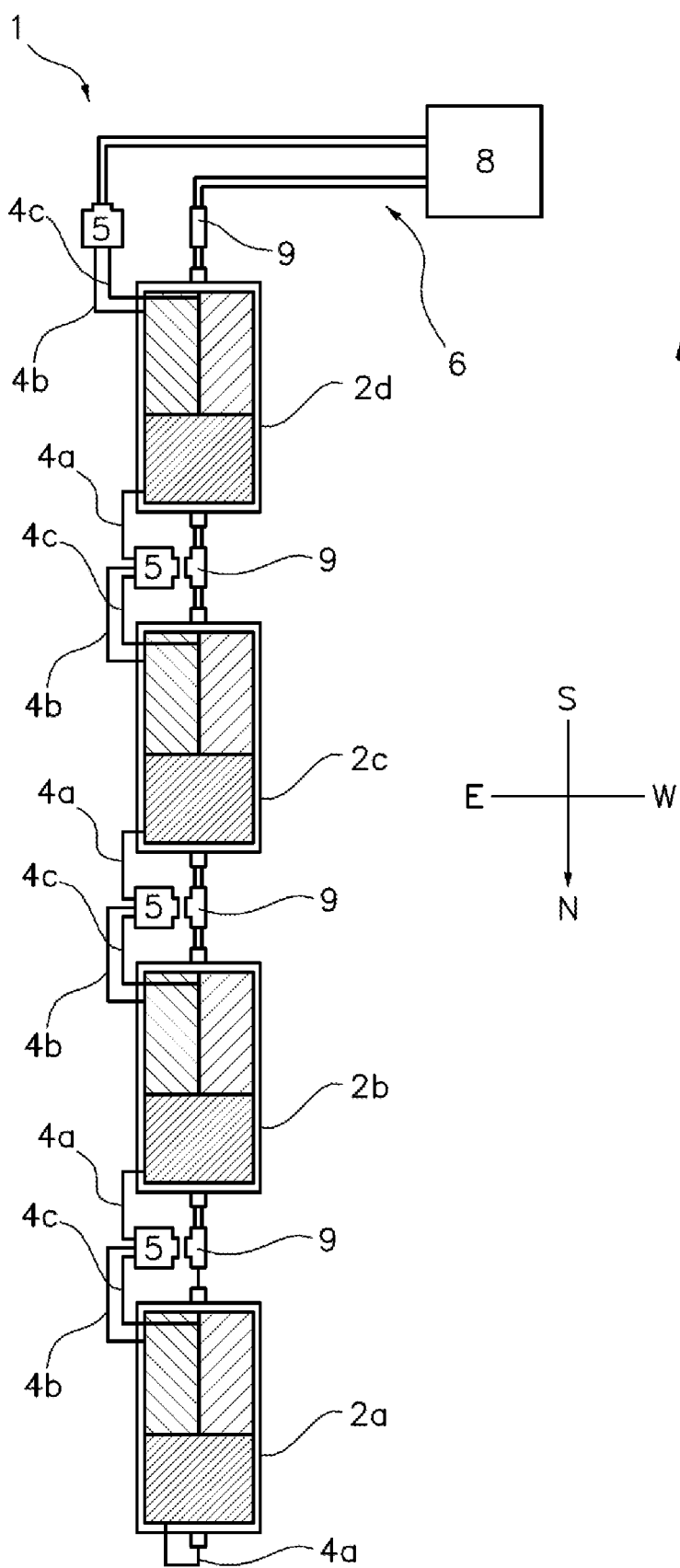
FIG. 3 illustrates a particular embodiment of a PV installation in which the trunk cable is connected directly to an inverter.

As mentioned previously, FIG. 1 illustrates a particular embodiment of a PV installation 1 which implements the proposed invention. This particular PV installation 1 comprises four solar trackers, 2a, 2b, 2c and 2d, arranged in a single row in a North-to-South (N-S) direction, in which each solar tracker, 2a, 2b, 2c and 2d, is made up of a plurality of PV modules 3 (as better seen in FIG. 2).

However, other alternative embodiments of a PV installation 1 may include a plurality of rows of solar trackers 2 distributed evenly or non-evenly in an East-to-West (E-W) direction (or vice versa), preferably in parallel rows at an optimum distance from one another. Each one of these rows will include at least one solar tracker 2, and the different rows of solar trackers 2 don't have to have the same number of solar trackers 2.

In the illustrated embodiment each one of the solar trackers, 2a, 2b, 2c and 2d, seen in FIG. 1 groups and connects the plurality of PV modules 3 into three independent output strings 4a, 4b and 4c. The PV modules 3 of each output string 4a-4c may be connected in series, parallel, in a leap-frog configuration or a combination thereof, although preferably in the leap-frog configuration.

Although it isn't shown in FIG. 1 (or FIG. 2), each one the output strings 4a-4c comprises a positive and a negative electric pole cable, both of which are then connected to a fuse-box 5 which is actually made up of two separate fuse-boxes: a first fuse-box which connects the positive electric pole cables of each output string 4a-4c, and a second fuse-box which connects the negative electric pole cables of each output string 4a-4c.

These fuse-boxes 5 are preferably installed in between or in proximity to the solar trackers 2, preferably attached to portion of the mechanical structure on which the solar trackers 2 of each row have been arranged, such as the frame, one of the structural support elements or the string-runner case, in order to optimize the use of space available in the PV installation 1, thus limiting the volume and length of electric cabling used in the harness.

The plug and play cable harness used to connect the different output strings 4a-4c of each solar tracker 2-2a-2d—uses a particular configuration in which in a first solar tracker 2a, the first output string 4a is connected directly to the trunk cable 6 and comprises an inline fuse, whereas the second and third output strings 4b, 4c are connected to the fuse-box 5. The output from the fuse-box 5 is connected to a connector 9, specifically a T-connector, arranged on the trunk cable 6 which connects all the solar trackers 2a-2d of the PV installation 1.

The first output string 4a of each of the second, third and fourth solar trackers, 2b-2d, are connected to a fuse-box 5 in addition to the second and third output strings, 4b-4c, of the immediate previous solar tracker 2 of the same row.

However, with regards to the fourth solar tracker, 2d, the second and third strings 4b-4c are connected to an additional fuse-box whose cable output is connected directly to the switch-box 7 and not to the trunk cable 6, which in turn is also connected to the switch-box 7.

It should be noted that the trunk cable 6 also comprises two separate trunk cables: a positive and a negative electric pole cable (not shown in either FIG. 1 or FIG. 2). The positive trunk cable, which connects all the positive electric pole cables of the output strings 4a-4c and the negative trunk cable, which connects all the negative electric pole cables of the output strings 4a-4c of each solar tracker 2.

The switch-box 7 comprises, at least, a surge arrester, connected to the ground, to protect the equipment used from exposure to an external or an internal overvoltage phenomenon, a predetermined number of input connectors, arranged in parallel, wherein each input connector comprises an inline fuse, which are then connected together, in parallel, to a main switch with a handle to be operated manually.

The output cable of the switch-box 7 may optionally be connected to an inverter 8, as seen in FIG. 1, in order to convert the direct current (DC) generated by the plurality of PV modules 3 in each solar tracker 2 of the PV installation 1 into alternating current (AC) to supply energy to an electrical grid or an off-grid electrical network.

FIG. 2 shows a detailed view of any one of the solar trackers 2 included in a PV installation 1, specifically a solar tracker 2 as seen in FIG. 1, in which it is possible to see how the plurality of PV modules 3 are grouped and connected together in three independent output strings 4a, 4b and 4c.

The crossed sections shown in each solar tracker 2a-2d, in either FIG. 1 or FIG. 2, represent the different groups of photovoltaic modules 3 which connected together form the different output strings 4a-4c of each solar tracker 2.

Any embodiment of the PV installation 1 will include one or more connector devices 9 which are preferably selected from a group comprising, at least, one or more single connectors, one or more T-connectors or combinations thereof or suitable connector devices.

It will be understood that various parts of one embodiment of the invention can be freely combined with parts described in other embodiments, even being said combination not explicitly described, provided there is no harm in such combination.

FIG. 3, illustrates an alternative embodiment of a PV installation 1, identical to the one described in FIG. 1 except for the absence of the switch-box 7, where the rows of solar trackers 2, through their trunk cable 6 are connected directly to an inverter 8.

Large photovoltaic, PV, installations are usually equipped with an electric distribution board, commonly known, in this technological field, as a string-box or combiner-box, which combines the strings into a cable output which is then connected to a central inverter, preferably positioned in a central position to optimise the cabling lay-out.

The solution disclosed in the PV installation 1 shown in FIG. 3, uses an inverter 8, specifically a string inverter, which has the advantage of optimising the maximum power output of each string 4 connected to it, since it controls and limits the current distribution to mismatch components, thus allowing the obtention of power values in the range of 150 kW. Moreover, the combination of the proposed cable harness configuration together with a string inverter supposes an additional cost save in the amount of cabling and protection devices used, such as fuses. This is due to the fact that each input of the string inverter 8 is independent from one another and has its own in-line fuse protection, and therefore each input isn't affected by possible malfunctions or reverse current flowing through other inputs of the inverter 8.

Whereas in the case of those PV installations that use a central inverter, due to all the inputs being connected in parallel, in order to avoid reducing the power total power output due to one or more input malfunctioning, each input of the central inverter must be equipped with an in-line fuse or other suitable protection device, as well as oversizing the cables so they can withstand possible current overcharge.

Figure 4A:
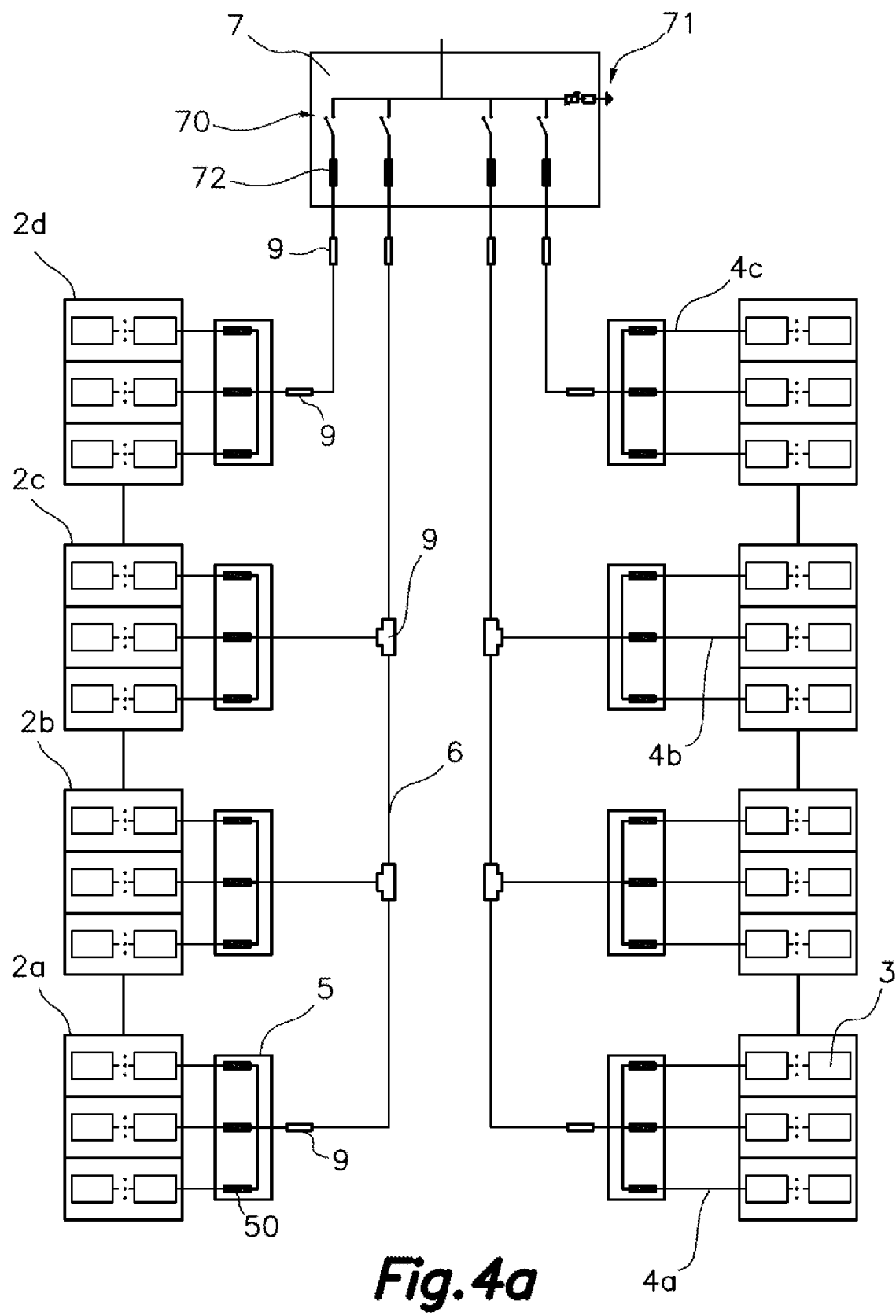
FIG. 4a and FIG. 4b illustrate respectively examples of the PV installation with a 9+3 wiring configuration and 10+2 wiring configuration.
Figure 4B:
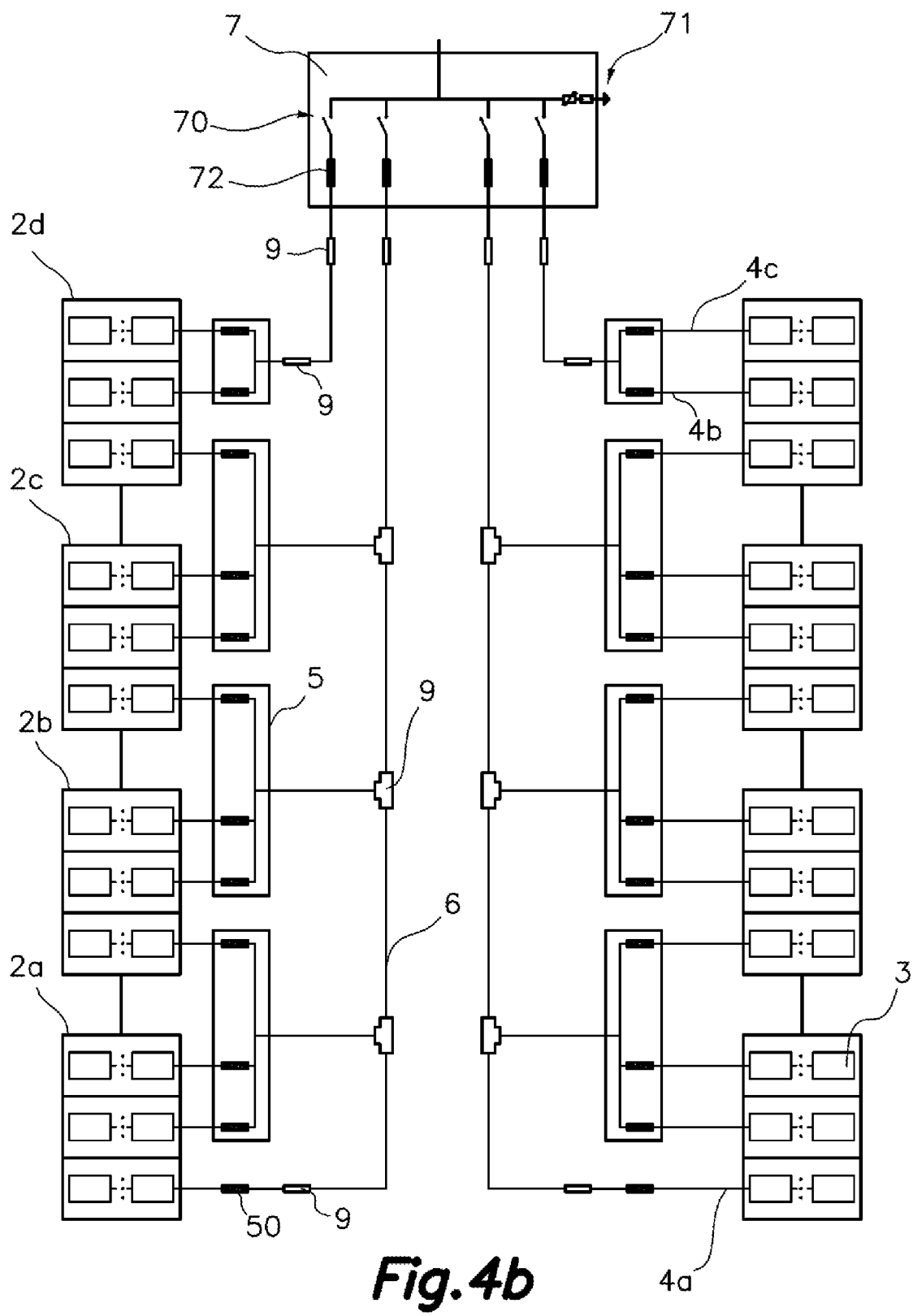

Finally, FIG. 4a and FIG. 4b illustrate different wiring configurations which can be used to connect the plurality of strings 4 of each row of solar trackers 2, wherein the PV installation 1 shown in FIG. 4a uses the 9+3 wiring configuration, and the PV installation 1 shown in FIG. 4b uses the 10+2 wiring configuration.

In both figures the PV installation 1 has two rows of solar trackers 2, each row comprising four solar trackers, 2a, 2b, 2c, 2d. Each solar tracker 2a, 2b, 2c, 2d, has three independent strings 4a, 4b, 4c, connecting a plurality of PV modules 3. The four independent trunk cables 6 are connected to the switch-box 7 by means of four separate connectors 9, preferably cable glands. Each cable input of the switch-box includes an in-line fuse 72 and a switch 70, the cables being connected in parallel, also including a surge arrester 71.

In the 9+3 wiring configuration, as seen in FIG. 4a, the strings 4a, 4b, 4c, of each solar tracker 2 are connected together to a 5, wherein each string input comprises an in-line fuse 50. The fuse-box 5 connects the string inputs in parallel generating a single cable output which is connected to the trunk cable 6 by means of connector 9, either a simple connector or a T-connector. The first three solar trackers 2a, 2b and 2c of each row are connected to the same trunk cable 6, whereas the last solar tracker 2d of each row is connected to an independent trunk cable 6.

On the other hand, in the 10+2 wiring configuration, as seen in FIG. 4b (previously described in FIG. 1), the first string 4a of the first solar tracker 2a of each row is connected directly to the trunk cable 6 using a connector 9 with an in-line fuse 50. The remaining two strings 4b and 4c of the first solar tracker 2a are connected to a fuse-box with the first string 4a of the second solar tracker 2b. This also occurs with the strings 4 of the third and fourth solar trackers, 2c and 2d, however the second and third strings 4b and 4c of the fourth solar tracker 2d of each row are connected to a separate trunk cable 6.

The invention claimed is:
1. A photovoltaic, PV, installation, comprising:
a plurality of solar trackers arranged in rows in a N-S direction,
each solar tracker comprising a plurality of photovoltaic modules, and
a switch-box and an inverter,
a trunk cable, and
a cable harness configuration to connect said plurality of solar trackers;
wherein said cable harness configuration comprises:
a plurality of output strings, for each solar tracker, each output string electrically connecting a predetermined number of said photovoltaic modules, and
one or more connector devices connecting said plurality of strings and said trunk cable, wherein each solar tracker has associated a fuse-box with a plurality of connection inputs according to the number of output strings of each solar tracker, connected in parallel, and said fuse-box has a single cable or connector output which is connected to the trunk cable through the use of said connector device, wherein the fuse-box includes a fuse connected in series with each input for each output string of the solar tracker, wherein each output string includes a positive electric pole cable and a negative electric pole cable, and wherein the trunk cable also includes a positive electric pole cable and a negative electric pole cable, which are connected to the switch-box and the inverter.

2. The photovoltaic, PV, installation according to claim 1, wherein the fuse-box of each solar tracker comprises two separate fuse-boxes units:
 a first fuse-box unit to connect the positive electric pole cables of each output string, and
 a second fuse-box unit to connect the negative electric pole cables of each output string.

3. The photovoltaic, PV, installation according to claim 1, wherein the fuse-boxes installed in each one of the rows of solar trackers, includes a measuring device configured to measure an electric current of each string inserted in each fuse-box.

4. The photovoltaic, PV, installation according to claim 3, wherein said electric current measuring device measures and transmits the measured electric current of each string inserted in each fuse-box to a control station of the PV installation.

5. The photovoltaic, PV, installation according to claim 3, wherein said electric current measuring device measures and transmits the electric current output from each fuse-box to a control station of the PV installation.

6. The photovoltaic, PV, installation according to claim 4, wherein said electric current measuring device measures and transmits the electric current output from each fuse-box to a control station of the PV installation.

7. The photovoltaic, PV, installation according to claim 1, wherein each solar tracker comprises three or more output strings.

8. The photovoltaic, PV, installation according to claim 1, wherein the photovoltaic modules of each output string are connected in a leap-frog configuration.

9. The photovoltaic, PV, installation according to claim 1, wherein each output string connects a predetermined number of photovoltaic modules.

10. The photovoltaic, PV, installation according to claim 9, wherein each output string connects at least 10 photovoltaic modules.

11. The photovoltaic, PV, installation according to claim 10, wherein each output string connects between 10 and 50 photovoltaic modules.

12. The photovoltaic, PV, installation according to claim 1, wherein the one or more connector devices are selected from the group consisting of one or more single connectors, one or more T-connectors and combinations thereof.

13. The photovoltaic, PV, installation according to claim 1, wherein the inverter is connected to the switch-box and converts direct current into alternating current.

14. The photovoltaic, PV, installation according to claim 1, wherein a first output string of a solar tracker at the start of a row of solar trackers is connected directly to the trunk cable and comprises an inline fuse.

15. The photovoltaic, PV, installation according to claim 1, wherein second and third output strings of a solar tracker at the end of a row of solar trackers are connected to an additional fuse-box whose cable output is connected directly to the switch-box and the inverter.

* * * * *